US 6,680,469 B2

(12) United States Patent
Shteynberg et al.

(10) Patent No.: US 6,680,469 B2
(45) Date of Patent: Jan. 20, 2004

(54) SEGMENTED LIGHT CURTAIN WITH KEYED INTERFACES

(75) Inventors: Boris Shteynberg, San Francisco, CA (US); James A. Ashford, San Carlos, CA (US)

(73) Assignee: Scientific Technologies Incorporated, Fremont, CA (US)

( * ) Notice: Subject to any disclaimer, the term of this patent is extended or adjusted under 35 U.S.C. 154(b) by 187 days.

(21) Appl. No.: 09/866,242

(22) Filed: May 25, 2001

(65) Prior Publication Data

US 2001/0025918 A1 Oct. 4, 2001

Related U.S. Application Data

(63) Continuation-in-part of application No. 09/523,406, filed on Mar. 10, 2000, and a continuation-in-part of application No. 09/626,098, filed on Jul. 26, 2000.

(51) Int. Cl.[7] ............................................... H01J 40/14
(52) U.S. Cl. ........................................ 250/221; 340/556
(58) Field of Search .............................. 250/221, 208.1; 340/545.3, 555–557

(56) References Cited

U.S. PATENT DOCUMENTS 5,003,169 A  *  3/1991  Sakaguchi et al. .......... 250/221
5,198,661 A  *  3/1993  Anderson et al. ........... 250/221

* cited by examiner

Primary Examiner—David Porta
Assistant Examiner—Stephen Yam
(74) Attorney, Agent, or Firm—Coats & Bennett, P.L.L.C.

(57) ABSTRACT

A coupling system allows interconnection of multiple light curtains segments but prevents interconnecting dissimilar segment types. A first connector half mounts to a segment while a second connector half mounts to another segment, such that mating the two halves interconnects the two segments. The two mating sections of the connector or coupling system may be formed as matched mating blocks that are mounted in different orientations, depending upon whether they are attached to transmitter or receiver type light curtain segments. One or both mating sections may rotatably mount to its respective segment, thereby providing an articulated connection between the joined segments. In other implementation, one mating section may be formed as a reversible coupler, with the other mating section formed as a mating receptacle that may be conveniently keyed to accept only a particular orientation of coupler.

27 Claims, 15 Drawing Sheets

10# SEGMENTED LIGHT CURTAIN WITH KEYED INTERFACES

RELATED APPLICATIONS

The present application is a continuation-in-part of application Ser. No. 09/523,406, filed on Mar. 10, 2000, and entitled "Modular Articulated Light Curtain," and a continuation-in-part of application Ser. No. 09/626,098, filed on Jul. 26, 2000, also entitled "Modular Articulated Light Curtain," the disclosures of which are hereby incorporated by reference herein in their entireties.

BACKGROUND OF THE INVENTION

Manufacturing machinery and other types of equipment oftentimes present one or more hazards to their operators or other adjacent personnel. Such machinery can be designed to minimize the hazards, and protective guards may be available to further mitigate the danger in some instances. However, it is often not possible to completely eliminate machinery hazards through protective guarding alone.

As an example, work piece loading and unloading operations routinely require machine operators to access or otherwise enter hazardous machine areas. While it is desirable for a worker to have access to a machine during such loading and unloading operations, it is frequently necessary to restrict such access during working phases of the machine. Light curtains are commonly used in this type of machine guarding application, and find broad use in a variety of other applications as well.

A typical light curtain comprises a receiver unit and a transmitter unit, along with supporting electronics and one or more machine control outputs. Light beams are transmitted across a hazardous area in or around a guarded machine from the transmitter unit to the receiver unit. When one or more light beams are blocked, such as by a human entering the hazardous area, the receiver unit detects the blockage and provides a signal to the supporting electronics which de-energizes the machine control outputs or otherwise removes power from the guarded machine.

As a type of optical presence sensing device, light curtains are available in a wide variety of types and configurations. Examples range from single beam models with simple on/off machine control, to sophisticated systems with hundreds of light beams and the ability to provide selective machine guarding in accordance with the loading, processing, and unloading cycles of the guarded machine. Other variations include reflective based systems, where reflectors are used to redirect transmitted light beams back to receiving units, which may be co-located with transmitting units, or to other reflecting units to extend the light beam coverage.

Indeed, extending the light beam coverage to conform to the sometimes-complex shapes of hazardous areas poses particular challenges. For example, multi-beam light curtains typically include a transmitter segment that comprises a linear array of spaced apart light emitters, with the receiver segment comprising a corresponding linear array of similarly spaced light receivers. Aligning the transmitter with the receiver forms a single plane of protection, which is suggested by the term "light curtain." However, machines commonly have potentially hazardous areas both above and below a work piece loading area.

One approach to adapting rigid light curtains to such applications uses multi-segmented light curtains that may be made to conform to the dimensions of the hazardous area. With this approach, the receiver and transmitter units comprise a like number of individual segments that are pieced or coupled together. Generally, the intersection between individual segments may be fixed at one or more angles, thereby allowing the segmented transmitter and receiver units to follow more complex contours and angles.

Oftentimes, receiver and transmitter light curtain segments use the same or at least very similar segment housings, connectors, and cables for economic and manufacturing reasons. However, the similarities cause a common field installation error of mistakenly interconnecting receiver type light curtain segments with transmitter type light curtain segments. At the least, this type of misconnection causes frustration and delay, and may also result in damage to misconnected segments. Thus, a segment connection system that uses the same parts or pieces for both receiver and transmitter segments and yet prevents segment misconnection is needed.

BRIEF SUMMARY OF THE INVENTION

The present invention comprises a method and apparatus for connecting light curtain segments together to form multi-segmented light curtains, while preventing misconnection between receiver type segments and transmitter type segments. A connector comprises first and second halves or mating sections, with each connector half mounting to a respective light curtain segment and allowing interconnection of the respective segments. The same connector is used to join both transmitter and receiver light curtain segments, but is configured in a first relative orientation for use with transmitter type segments, and is configured in a second relative orientation for use with receiver type segments. The differing configurations of the connector prevent misconnection of transmitter segments with receiver segments.

In an exemplary embodiment, the mating sections comprise a coupler assembly and a mating receptacle. A coupler portion of the coupler assembly is preferably made as a detachable plate or tongue that mounts to one end of a light curtain segment. The coupler has one or more distinct features, such as protruding tabs. The mating receptacle, which mounts to an end of another segment, comprises receiving features, such as tab seats (e.g., cavities) that accommodate the protruding tabs of the coupler. By mounting the coupler to a segment in a first orientation, its protruding tabs occupy first positions relative to the mating receptacle. Reverse mounting the coupler reverses its tabs to second positions relative to the mating receptacle. By including first and second sets of tab seats as receiving features in the mating receptacle, it operates to receive the coupler in either the first or second orientations.

Preferably each set of tab seats include keying holes positioned within the cavities defining the tab seats. A keying pin or other type of blocking post or stud may be positioned in any of these keying holes. If keying pins are fixed within the second set of tab seats, couplers in the second configuration cannot be mated with the receptacle. Conversely, positioning keying pins within the first set of tab seats prevents couplers in the first orientation from mating with the receptacle. In this manner, the same receptacle may be used for both receiver type and transmitter type light curtain segments and selectively keyed as needed. Preferably, the keying holes are threaded such that the keying pins may be conveniently installed or removed as needed.

The coupler generally includes one or more mounting holes, with corresponding mounting holes in the receptacle. Screws or other type of fastener may thus be used in conjunction with these mounting holes to securely connect the coupler assembly to the receptacle, thus securely joining the light curtain segments together. In addition to providing for secure physical connection between segments, the coupler assembly and receptacle preferably include complementary signal connectors that interconnect the various signals running between the interconnected segments.

In other embodiments, the first and second mating sections comprise mating blocks having complementary mating features. By reversing the orientation of one or both of these mating sections relative to the light segments on which they are mounted, depending on whether the segments are receiver types or transmitter types, misconnection between dissimilar segment types is prevented. One or both of the mating sections may be rotatably mounted on its respective segment, thereby allowing articulation of joined segments.

DETAILED DESCRIPTION OF THE INVENTION

Figure 1:
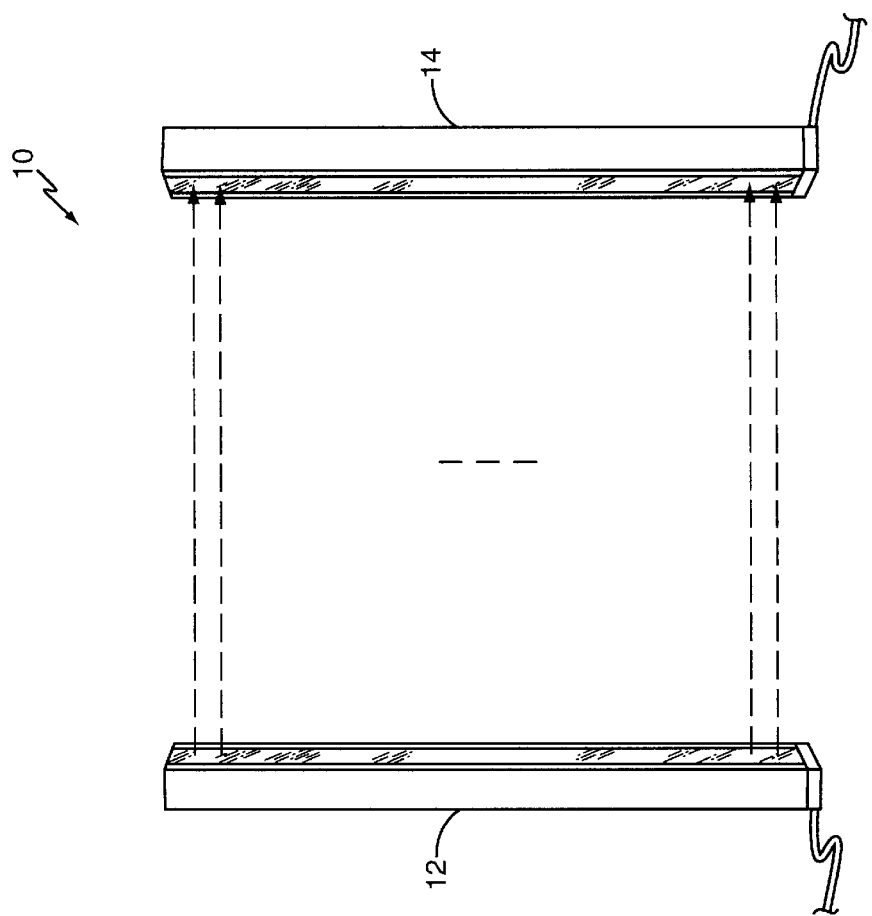
FIG. 1 is a diagram of a conventional, single-segment light curtain.

FIG. 1 illustrates a conventional light curtain system generally referred to by the numeral 10. A transmitter 12 is positioned opposite from and in alignment with a compatible receiver 14. While not shown in its typical environment, the system 10 is generally used to guard hazardous machinery or equipment. Usually, the transmitter 12 and receiver 14 are positioned such that the system 10 provides a "curtain" of light beams in advance of the hazardous area. Obstruction of one or more of the beams results in the system 10 de-energizing the guarded machinery, with the purpose of stopping the machine before an intruding human can be injured. Note that the machine-control outputs or signals provided by system 10 are not shown for brevity.

System 10 may be adapted to complex machine cycles to allow work piece loading or unloading at specified times in the machine cycle. Further, it may employ sophisticated obstruction detection algorithms that allow for some types of blockages, even if such blockages are dynamic. However, the system 10 has the obvious limitation of defining a single plane of protection. That is, the system 10 provides for a single linear array of light beams between the transmitter 12 and receiver 14.

Often, hazardous areas have complex perimeters or contours and may require multiple planes of protection, or may even require curved sets of light beams to insure adequate guarding. In these instances, segmented light curtain systems may be advantageous. In a segmented light curtain, individual segments are coupled together to form longer systems. Segment couplings can provide articulation, allowing the collection of joined segments to conform to the actual perimeters of the hazardous area.

Figure 2A:
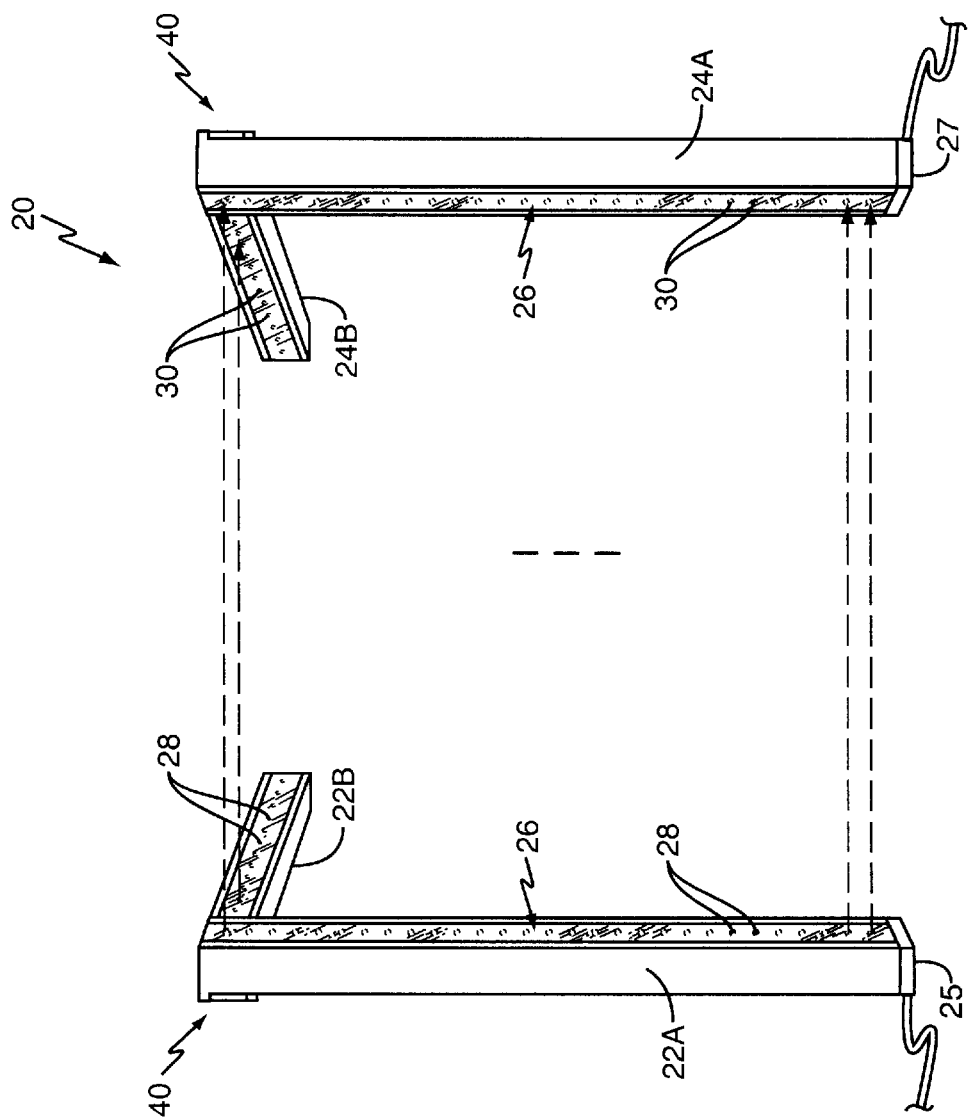
FIGS. 2A and 2B are diagrams of a multi-segment light curtain incorporating an exemplary embodiment of the light curtain segment connector of the present invention.
Figure 2B:
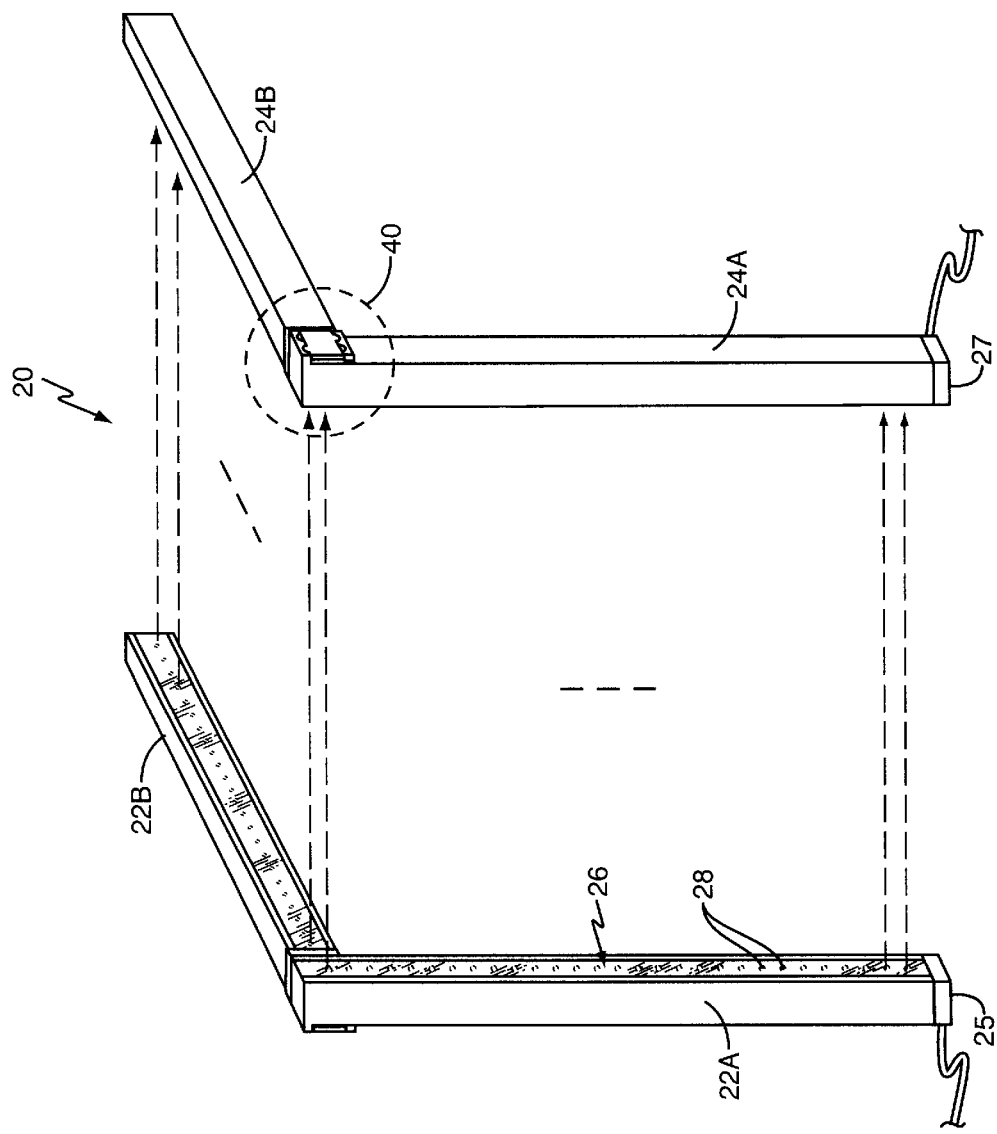

FIGS. 2A and 2B illustrate an exemplary multi-segment light curtain system 20, which comprises transmitter segments 22 and receiver segments 24. For purposes of discussion, a first transmitter segment is more particularly referenced as 22A, with a corresponding second transmitter segment referenced as 22B. Similarly, the two receiver segments 24 are particularly referenced as receiver segments 24A and 24B. Connectors generally referred to by the numeral 40 join transmitter segments 22 and receiver segments 24, respectively. The connectors 40 incorporate exemplary keying techniques associated with the present invention to prevent misconnection of a transmitter segment 22 with a receiver segment 24. The connector 40 interconnecting the receiver segments 24 is shown more clearly in FIG. 2B.

While the joined transmitter and receiver light curtain segments 22 and 24 are shown coupled together at right angles, the connectors 40 may be configured to mate respective light curtain segments at any desired angle. This may be achieved, for example, by mounting the respective halves of the connector 40 to respective segment ends at desired angles, or may be achieved by other means, such as by adjusting the mating angle of the connector halves.

The transmitter segments 22 each have a face 26, which typically comprises an optically transparent material. An array of light emitters 28 are positioned behind the face 26 at spaced apart intervals along the length of each transmitter segment 22. Each receiver segment 24 includes a similarly spaced array of light receivers 30, each one corresponding to an opposing light emitter 28.

Transmitter segment 22A has a terminating end-cap 25 attached at the end opposite that joined to segment 22B. Receiver segment 24A has a similar end-cap 27 attached to it. These end-caps 25 and 27 provide termination for multi-segment transmitter and receiver light curtain assemblies. Typically, the end-caps 25 and 27 provide interconnection between the light curtain 20 and a power source, as well as associated processing electronics and the guarded machine's main power relay. Of course, the nature and number of signal interconnections brought into and out of the segments 22 and 24 by the end-caps 25 and 27 depend upon the specific implementation of the light curtain system 20.

In the illustration, transmitter segment 22A aligns with receiver segment 24A to provide a vertical plane of light beam protection, while the transmitter segment 22B aligns with receiver segment 24B to provide a horizontal plane of light beam protection. The light curtain defined by system 20 includes a ninety-degree bend and is substantially more flexible in terms of providing zone protection in hazardous applications requiring more than just a single plane of protection. Of course, system 20 may be expanded with additional transmitter segments 22 and additional receiver segments 24, and may include inter-segment angles at other than ninety degrees and other light beam plane orientations. Also, the individual segments 22 and 24 may be curved, straight, or angled, and may form articulated multi-segment light curtains that adapt to complex perimeter requirements.

Figure 3B:
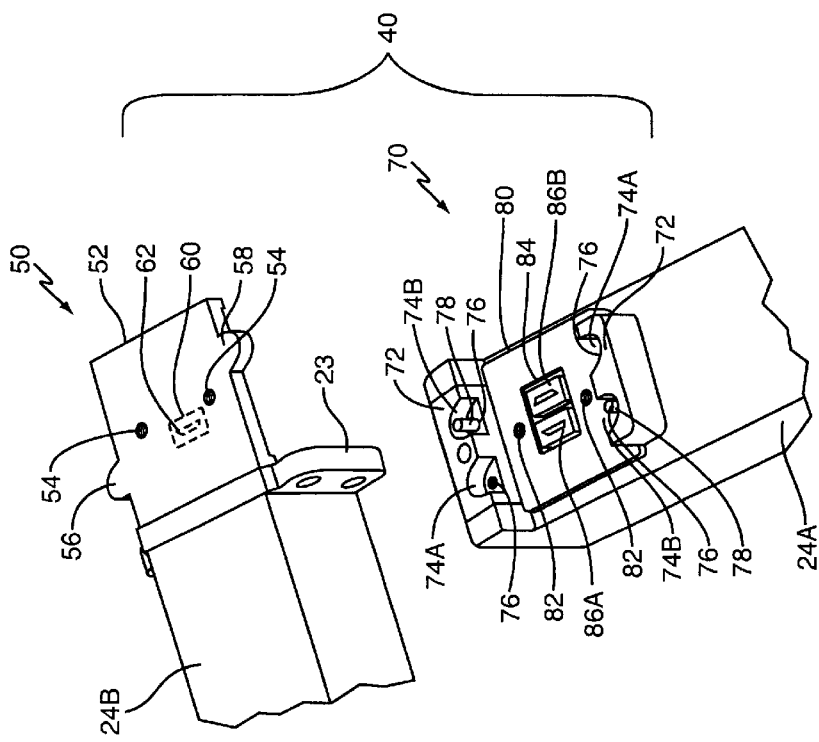
FIG. 3B is a diagram of the connector of FIG. 3A, but keyed for use with receiver type light curtain segments.
Figure 3A:
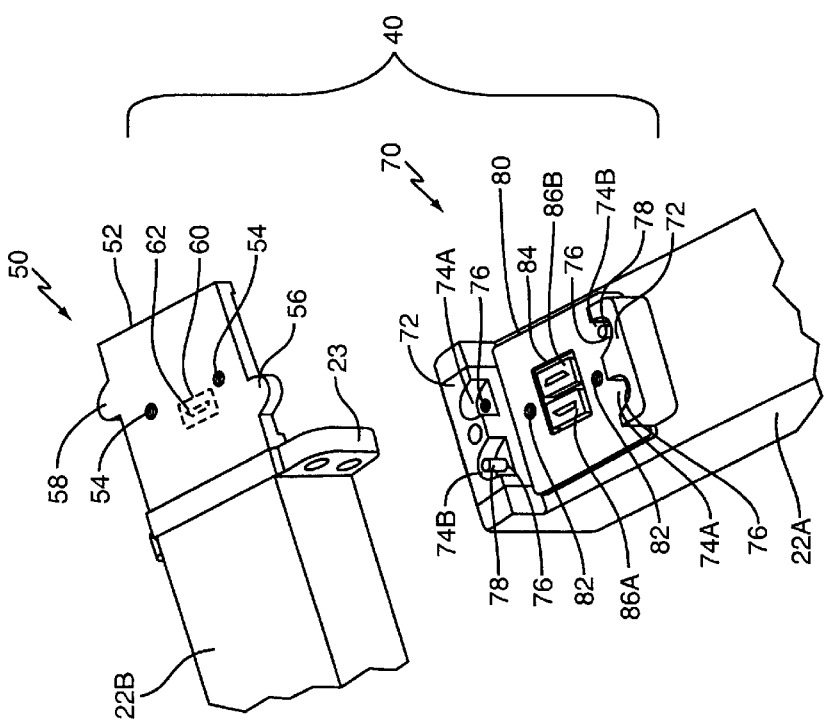
FIG. 3A is a diagram of an exemplary embodiment for the connector of FIGS. 2A and 2B, keyed for use with transmitter type light curtain segments.

In an exemplary embodiment, the connectors 40 comprise a coupling system for joining light curtain segments together. FIGS. 3A and 3B illustrate this embodiment of the connector 40. In FIG. 3A the connector 40 is keyed for use with transmitter segments 22, and in FIG. 3B, it is keyed for use with receiver segments 24. Keying the connector 40 is accomplished by putting the connector 40 in different configurations or relative orientations. Both FIGS. 3A and 3B provide a back view perspective of the segments 22 and 24, respectively. That is, the segment sides opposite the transmitter and receiver faces 26 are shown.

The connector 40 comprises a coupler assembly 50 and a mating receptacle 70 that allows a segment 22 or 24 carrying a coupler assembly 50 to be joined with a segment 22 or 24 carrying a mating receptacle 70.

The coupler assembly 50 comprises a coupler 52, which defines mounting holes 54, and offset protruding tabs 56 and 58. The coupler 52 also defines a signal connector opening or window 60, with a signal connector 62 positioned therein.

As noted, a first configuration of the coupler assembly 50 is used for transmitter segments 22, and a second configuration is used for receiver segments 24. Preferably, these first and second configurations are determined by the mounted orientation of the coupler 52. In this embodiment, the coupler 52 is mounted to a transmitter segment 22 in a first orientation, and mounted to a receiver segment 24 in a second, reverse orientation.

Preferably, the coupler 52 is a flat tongue or plate made from metal or other rigid material that is a detachable, such that, as noted above, the first and second orientations are achieved by reversing its mounting orientation relative to transmitter segments 22 and receiver segments 24. This allows the same coupler 52 to be used for both receiver and transmitter applications, with attendant economic and manufacturing benefits. However, in some instances, it may be desirable to form the coupler 52 as an extension of the segment housing. In this scenario, housings for transmitter segments 22 would be manufactured with the coupler 52 in a first orientation, and housings for receiver segments 24 manufactured with it in a second, reverse orientation.

The protruding tabs 56 and 58 are positioned diagonally opposite from each other along the edges or sides of the coupler 52. When the coupler 52 is mounted to a transmitter segment 22, the protruding tabs 56 and 58 occupy first positions relative to the receptacle 70, shown in FIG. 3A. When it is reverse mounted to a receiver segment 24, the tabs 56 and 58 occupy reversed second positions relative to the receptacle 70. This second orientation is shown in FIG. 3B.

The mating receptacle 70 comprises receiving features operative to receive both first and second relative orientations of the coupler 52. Thus, the same mating receptacle 70 may be used for joining either receiver segments 24 or transmitter segments 22. In this exemplary embodiment, the receiving features are defined by opposing keying blocks 72. These keying blocks 72 define a first set of cavities or tab seats 74A, and a second set of tab seats 74B. The tab seats 74A correspond to the first tab positions occupied by tabs 56 and 58 of the coupler 52 when it is mounted to transmitter segments 22 in its first orientation. Similarly, the tab seats 74B correspond to the second tab positions occupied by tabs 56 and 58 of the coupler 52 when it is mounted to receiver segments 24 in its second orientation.

The receptacle 70 is keyed in a first configuration when mounted to a transmitter segment 22, and is keyed in a second configuration when mounted to a receiver segment 24. Keying the receptacle 70 for use with transmitter segments 22 comprises obstructing or otherwise blocking tab seats 74B, while leaving tab seats 74A unobstructed. In this manner, the receptacle 70 will mate with couplers 52 oriented for transmitter segments 22, but will not mate with couplers 52 oriented for receiver segments 24. Similarly, keying the receptacle 70 for use with receiver segments 24 comprises obstructing or otherwise blocking tab seats 74A, while leaving tab seats 74B unobstructed.

Note that the first and second configurations of the coupler assembly 50 and the corresponding configurations of the mating receptacle 70 employ a mirror-imaging scheme, such that the relative physical features between the coupler assembly 50 and the mating receptacle 70 are essentially reversed between the first and second configurations.

This allows a coupler assembly 50 to be seated within the receptacle 70 from either side. That is, the coupler assembly 50 fixed to the end of segment 22B (or 24B) may be mated with the receptacle 70 from either side of segment 22A (or 24A).

In the interest of simplifying keying with respect to the receptacle 70, the tab seats 74A and 74B preferably include holes 76 positioned within the bottom surface of each tab seat 74. In an exemplary embodiment, the holes 76 are threaded, such that keying pins or studs 78 may be conveniently threaded into the holes in either set of tab seats 74. Placing the receptacle 70 in its first configuration for use with transmitter segments 22 is a simple matter of mounting keying pins 78 within the tab seats 74B, thus blocking the insertion of receiver-oriented coupler assemblies 50. In similar fashion, moving the keying pins 78 from tab seats 74B to tab seats 74A blocks the insertion of transmitter-oriented coupler assemblies 50.

The receptacle 70 further comprises a mounting face 80, which itself comprises mounting holes 82, a connector opening 84, and signal connectors 86A and 86B positioned therein. Mating a coupler assembly 50 with a receptacle 70 comprises mating the signal connector 62 of the coupler assembly 50 with one of the two signal connectors 86A or 86B of the receptacle 70, and mechanically securing the coupler assembly 50 to the receptacle 70. The signal connector 62 may be a male connector and the signal connectors 86A and 86B female connectors, or vice versa. Preferably, the signal connectors 62 and 86A and 86B comprise a plurality of signal lines, such as electrical conductors, for routing signal lines such as data, timing, or control, between two or more interconnected light curtain segments 22 or 24.

By using two signal connectors 86A and 86B in the receptacle 70, a segment 22 or 24 carrying the coupler assembly 50 can mount from either side of a segment 22 or 24 carrying a receptacle 70 without changing the relative interconnection of signal lines between the segments. That is, the connector 86B may be pinned in reverse relative to the connector 86A. This allows "pin 1" of the connector 62 to connect to the "pin 1" of connector 86A when segment 22B or 24B is mounted from the left relative to segment 22A or 24A, and to connect to "pin 1" of the connector 86B when mounted from the right. The offset of the connector 62 from the centerline of the mounting holes 54 in the coupler 52 allows it to mate with connector 86A from the left, and to mate with connector 86B from the right.

Mounting holes 54 in the coupler 52 align with mounting holes 82 in the mounting face 80 of the receptacle 70, and permit the coupler assembly 52 to be securely mated with the receptacle 70. Thus, a segment 22 (24) having a coupler assembly 50 at one end may be securely fastened to another segment 22 (24) having a receptacle assembly 70 at one of its ends. Note that one or both of the segments 22 (24) may have a pedestal 23 or other flange-like feature with a face perpendicular to the body of the adjoining segment 22 (24), which may provide additional mounting points for securing joined segments 22 (24).

Figure 4:
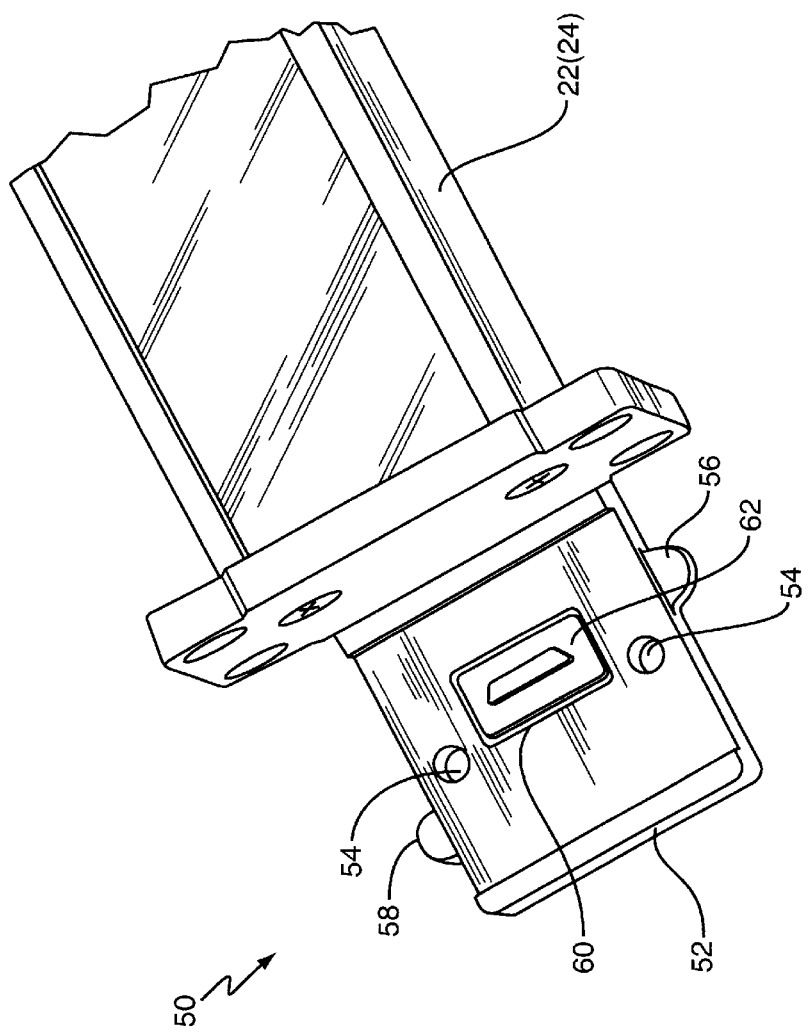
FIG. 4 is a more detailed diagram of the coupler assembly comprising one half of the connector shown in FIGS. 3A and 3B.

FIG. 4 provides a front perspective view of the coupler assembly 50, and thus provides more details regarding the connector opening 60 and signal connector 62. Substantially flexibility exists with regard to selecting the specific connector type used, and it may be varied based on the number or type of signals (e.g., electrical, optical) that Co must be connected between coupled segments 22 or 24.

Figure 5:
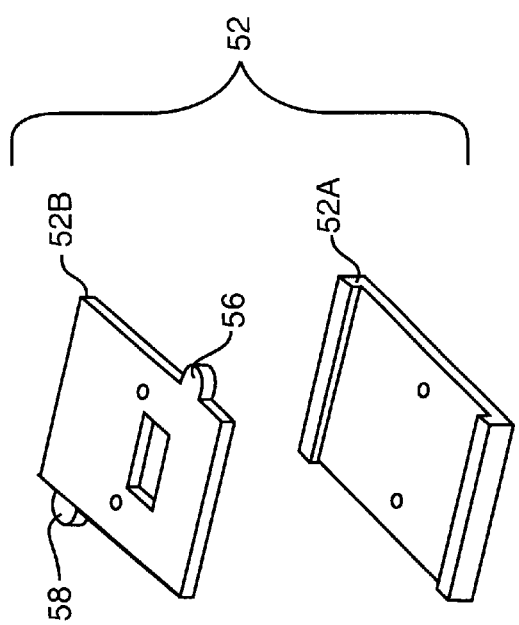
FIG. 5 is a diagram of an exemplary design for the coupler of FIG. 4.

FIG. 5 depicts an exemplary arrangement for the coupler 52. A mounting plate 52A is fixed to both transmitter and receiver type segments 22 and 24, respectively, and a reversible keying plate 52B is mounted or connected to the plate 52A in a first orientation for transmitter use and a second, reverse orientation for receiver use.

Figure 6:
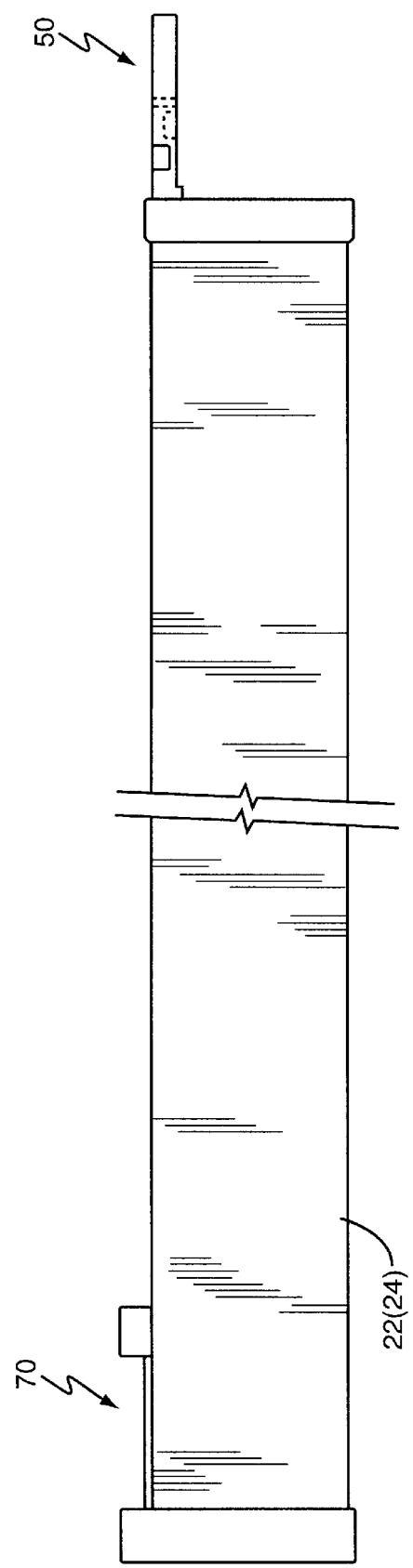
FIG. 6 is a diagram of a light curtain segment with a coupler assembly mounted at one end and a mating receptacle mounted at its other end, for connecting to other segments at each end.

FIG. 6 depicts a segment 22 or 24 having a coupler assembly 50 fixed at one end of the segment 22 or 24, and a mating receptacle 70 fixed at the segment's other end. This configuration allows the coupler end of the first segment 22 or 24 to be mated with a receptacle end of a second segment 22 or 24, and the receptacle end of the first segment 22 or 24 to be mated with a coupler end of a third segment 22 or 24, and so on. Of course, all of the coupler assemblies 50 and mating receptacles 70 used for a given collection of segments 22 or 24 will all have the same keying configuration. In this way, misconnection of segments 22 with segments 24 is prevented.

Figure 7A:
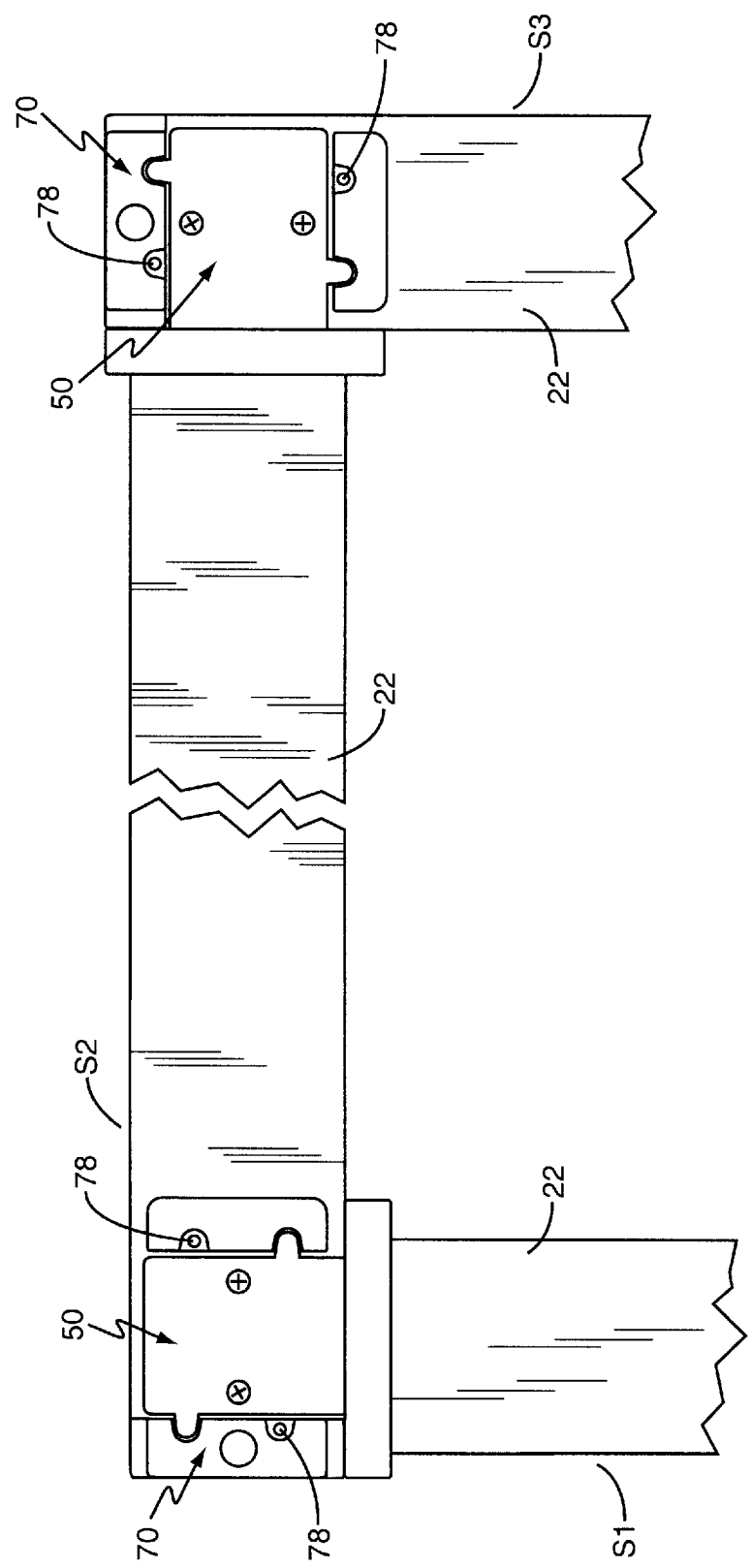
FIGS. 7A–7D are diagrams of multiple light curtain segments coupled together using the segment connector detailed in FIGS. 3A and 3B.
Figure 7B:
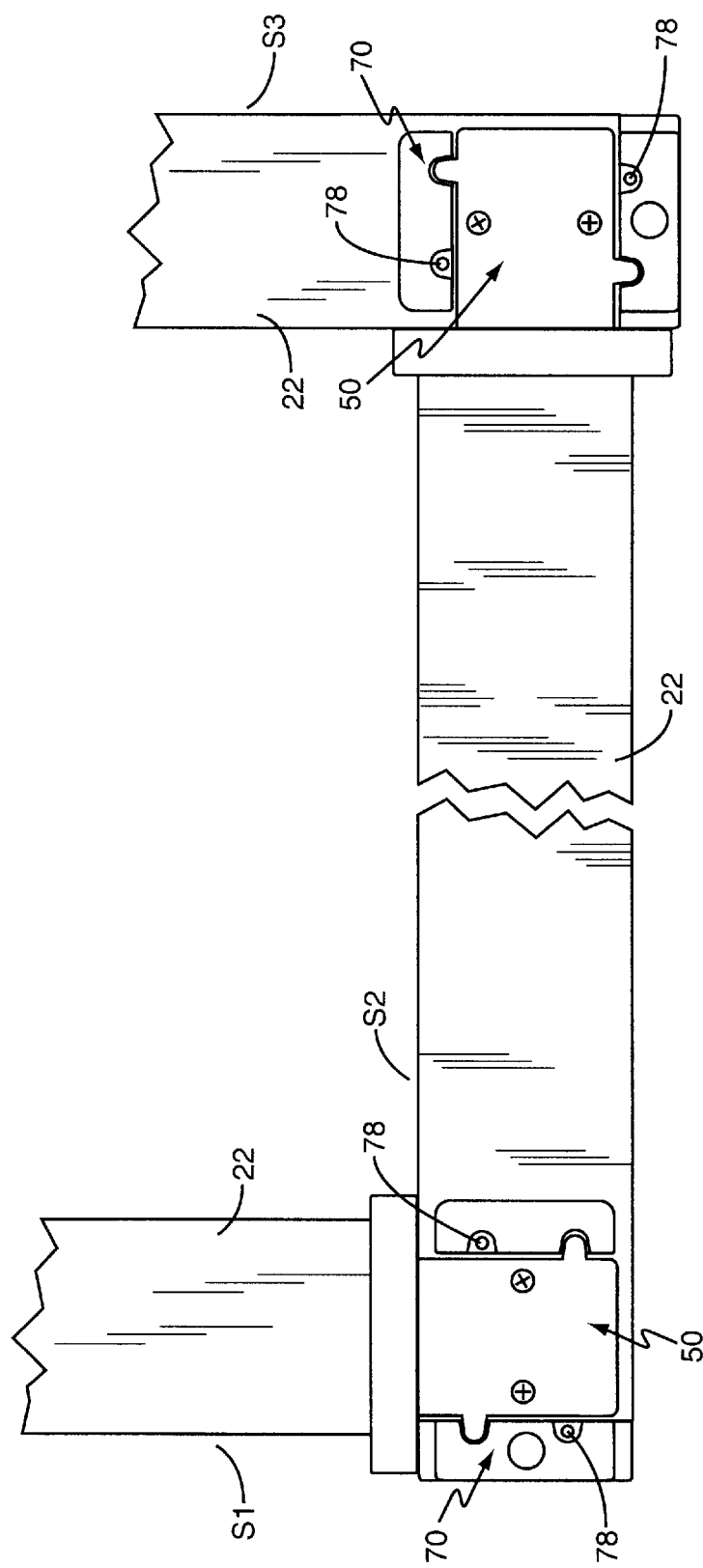
Figure 7C:
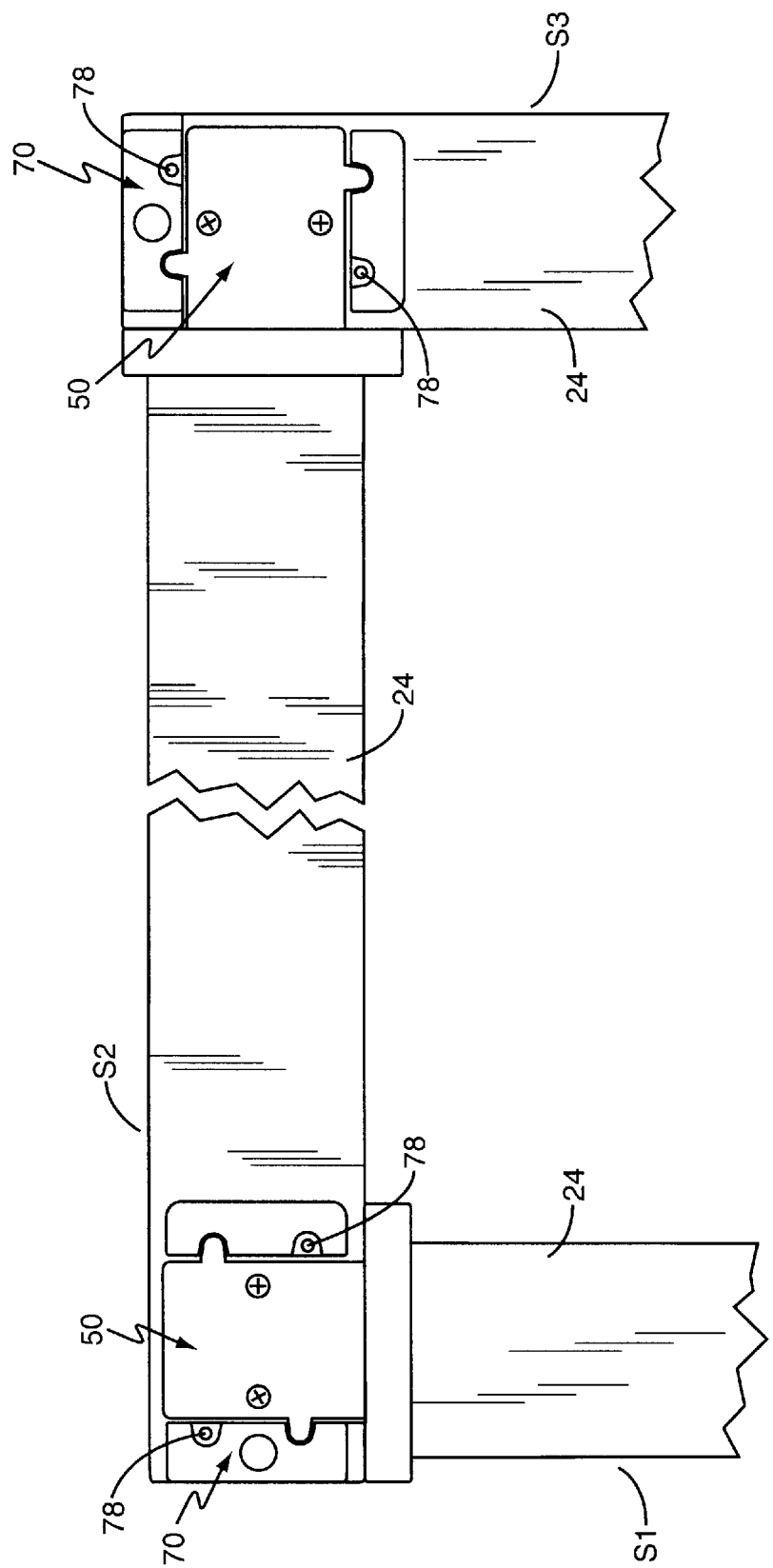
Figure 7D:
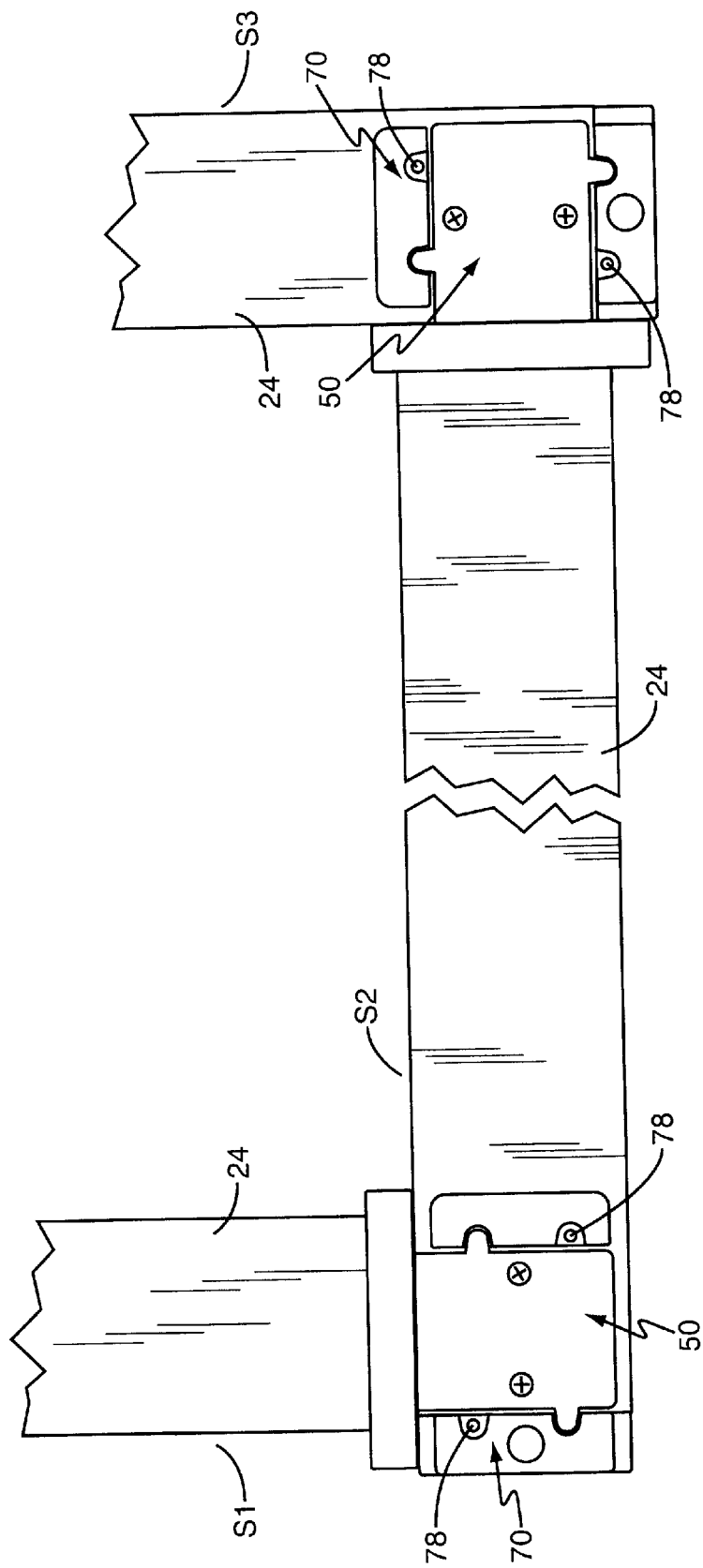

FIG. 7A illustrates transmitter type segments 22 interconnected in a typical arrangement. Segments S1 and S3 are mounted from the left side of segment S2 in relative terms. Also, one can observe the configuration of connectors 40 for use with transmitter type segments 22. FIG. 7B illustrates segments S1 and S3 mounted from the opposite or right side of segment S2. Similarly, FIGS. 7C and 7D illustrate the same relative mounting arrangements 7A and 7B, but with the connectors 40 configured for receiver-type segments 24. In both configurations, the mirror imaging of keying features between the coupler assemblies 50 and receptacles 70 permits installation from either side of a given segment 22 or 24, while still preventing misconnections between different segment types.

If the segments S1, S2, and S3 are transmitter segments 22, the couplers 52 on segments S1 and S2 have tabs 56 and 58 positioned to seat within tab seats 74A, with keying pins 78 fixed in tab seats 74B. If the segments S1, S2, and S3 are receiver segments 24, the couplers 52 are reversed such that the tabs 56 and 58 are positioned to seat within tab seats 74B. Correspondingly, the keying pins 78 are reversed. That is, the keying pins 78 are moved from tab seats 74B to tab seats 74A.

In general a segment 22 or 24 may be configured to include a coupler assembly 50 at one end, and a mating receptacle 70 at its other end, if it is desired to interconnect the segment 22 or 24 at both of its ends. Obviously, this arrangement may be varied in any combination. Further, it may be desirable to place a coupler assembly 50 or mating receptacle 70 at one end of a segment 22 or 24, and then terminate its other end with an end-of-segment interface, such as with an end cap 25 or 27 having an interface for external wiring to carry power and control, or other signals.

While the above illustrations depict segments 22 or segments 24 joined a fixed ninety-degree angles, the same concept may be used to establish any fixed angle between joined segments. Of course, the orientation and design of mating features between the coupler assembly 50 and the mating receptacle 70 may be changed as needed to fix the mating angle in accordance with the desired inter-segment angle. For example, the style, position, number, or orientation of mating features (e.g., tabs 56/58 and tab seats 74) and signal connectors (e.g., 62, and 86) may be changed or modified as needed.

Further, as earlier noted, the present invention may be adapted to fully articulated multi-segment light curtain assemblies. The related applications from which the instant application claims priority benefit, and which are incorporated herein by reference, both illustrate exemplary articulated light curtain systems.

In particular, FIGS. 8A–B and FIGS. 9A–B illustrate the present invention adapted to an exemplary system and method for articulating joined light curtain segments (22 or 24) as disclosed in the incorporated, co-pending applications earlier named.

Figure 8A:
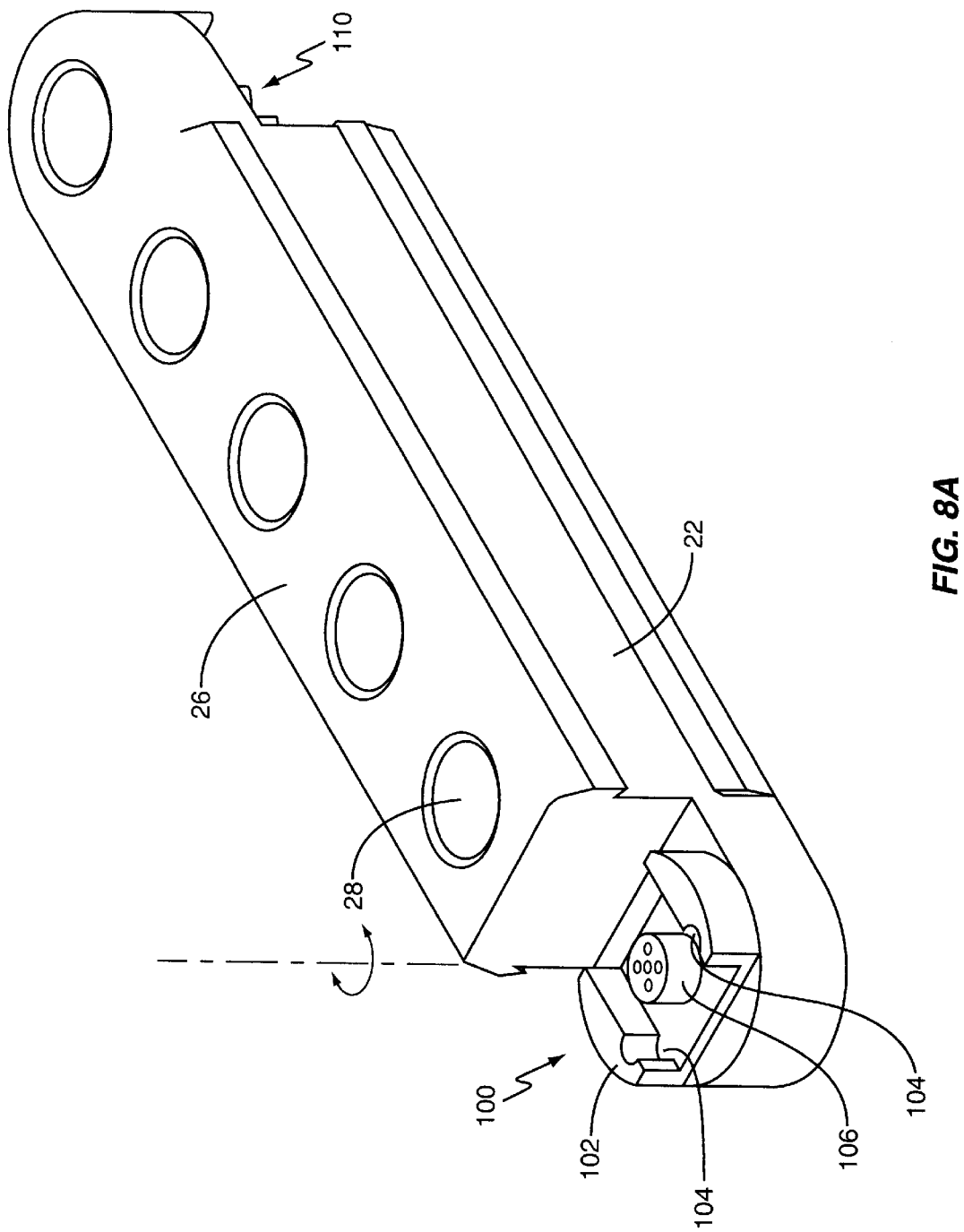
FIGS. 8A and 8B are diagrams of an alternate exemplary connector configured for joining transmitter type segments.
Figure 8B:
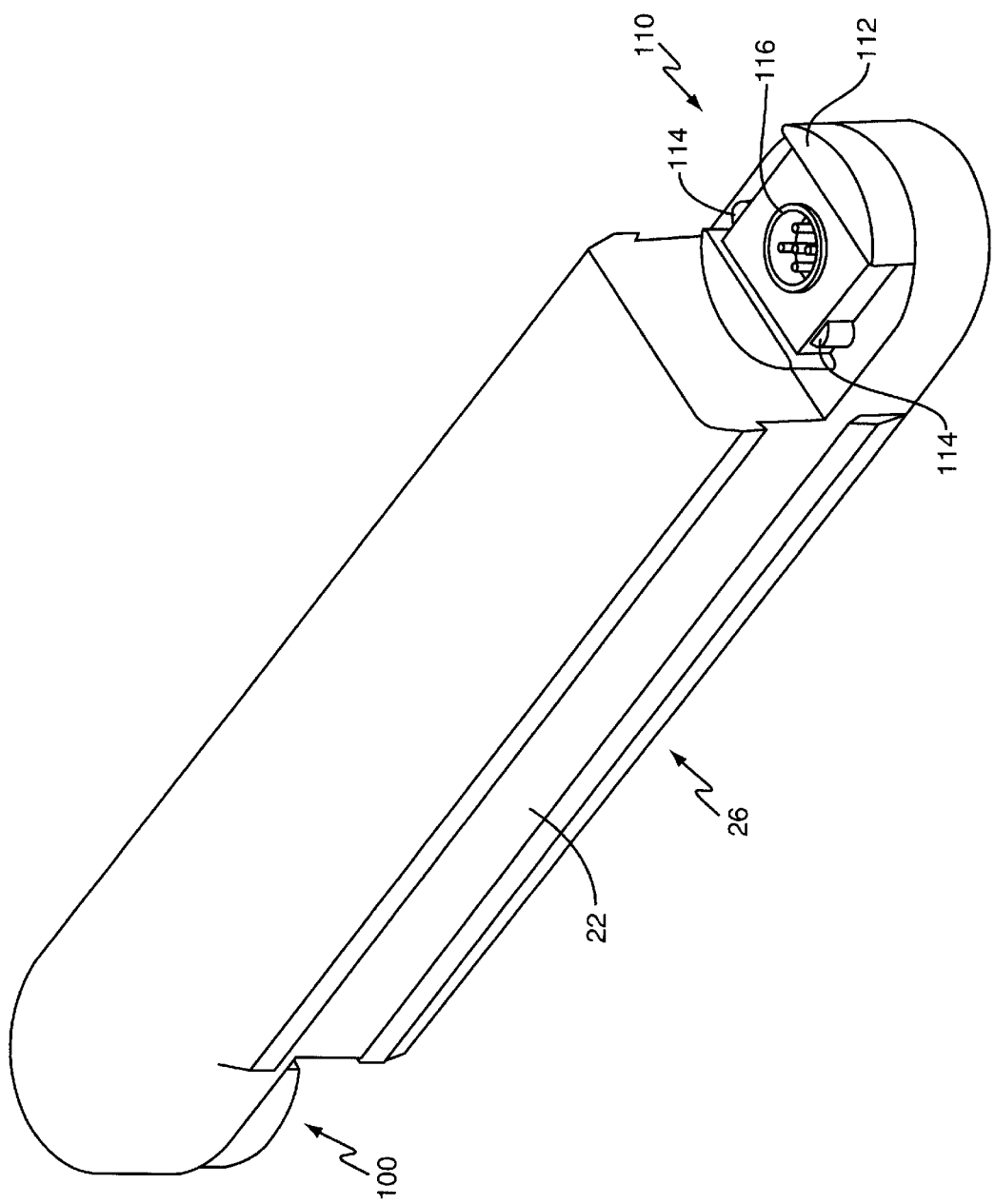
Figure 9A:
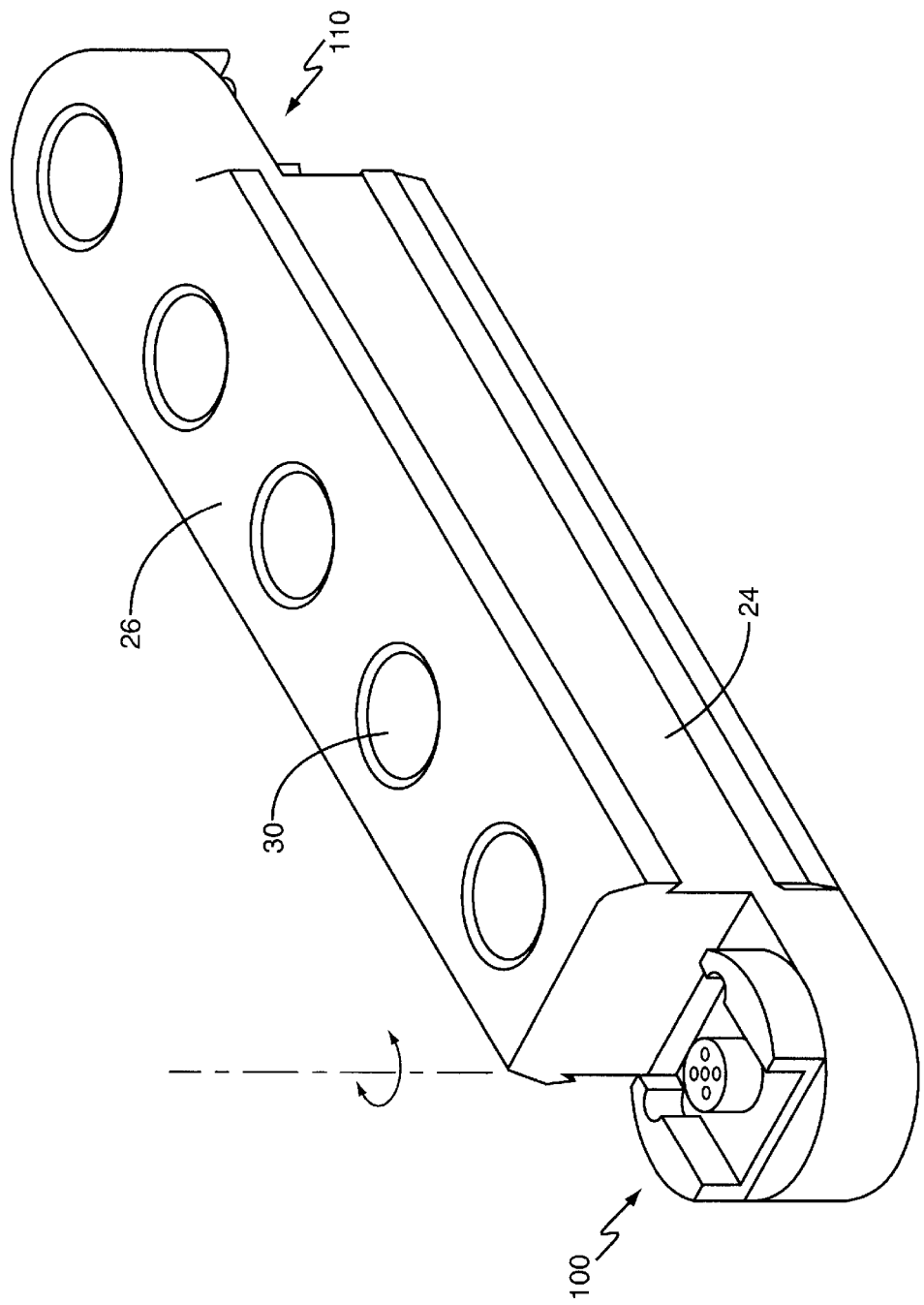
FIGS. 9A and 9B are diagrams of the connector of FIGS. 8A and 8B but configured for joining receiver type segments.
Figure 9B:
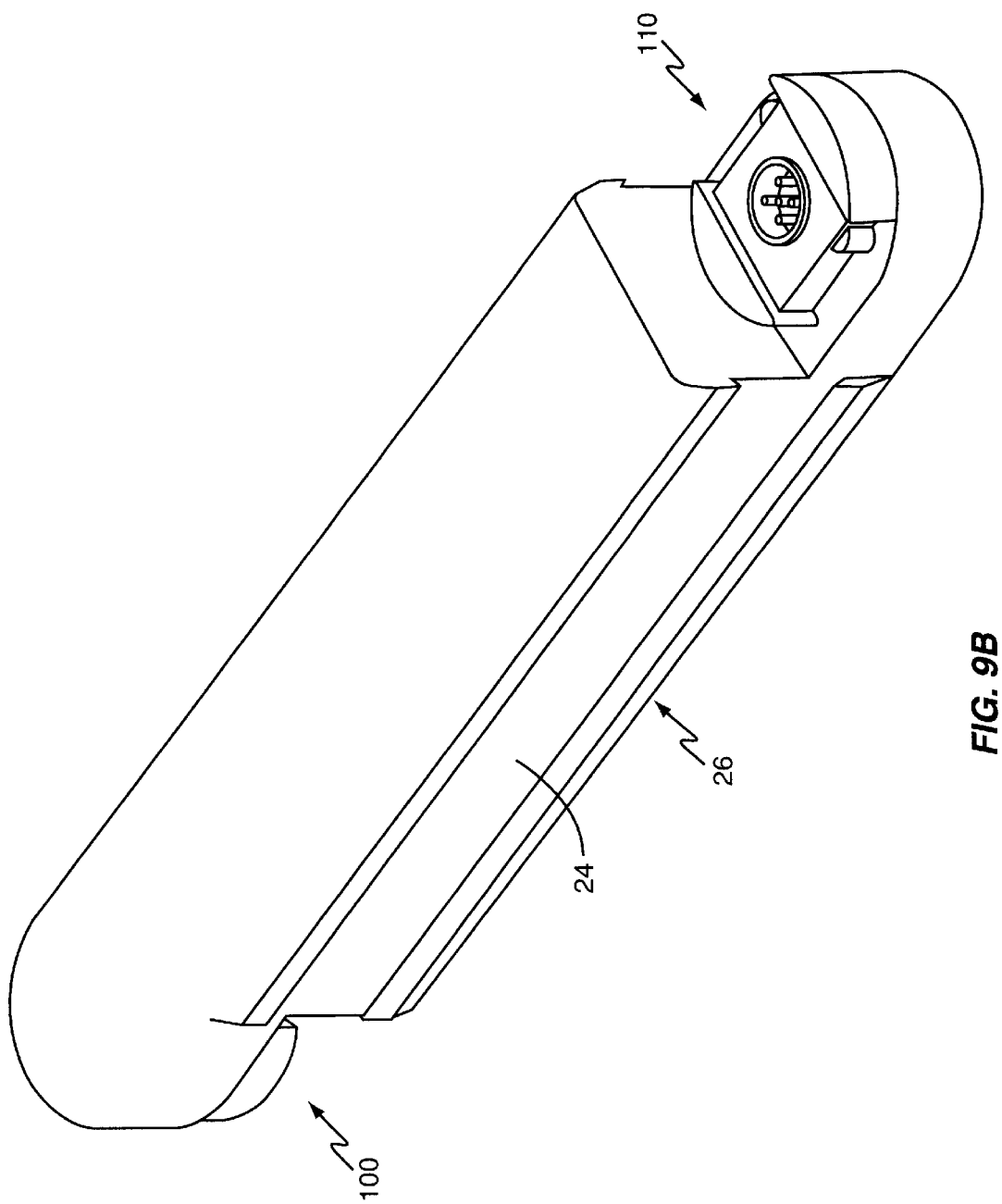

FIGS. 8A and 8B illustrate first and second mating sections 100 and 110 positioned on or attached to opposite ends of a transmitter type segment 22. FIG. 8A shows a front view of the segment 22 with the mating section 100 in the foreground, while FIG. 8B depicts a back view of the segment 22, rotated such that the end with connector 110 is shown in the foreground. FIGS. 9A and 9B show similar depictions of a receiver type segment 24 with the mating sections 100 and 110 positioned at opposite ends. An end of a segment 22 or 24 having a mating connector 100 mates with an end of another segment 22 or 24 having a mating connector 110, thus allowing multiple segments 22 or 24 to be joined together by mating the two complementary mating sections 100 and 110.

The segments 22 and 24 are depicted with rounded distal ends in accordance with the above incorporated, co-pending applications. In this embodiment, the ends of segments 22 and 24 are formed with cut away ends, with one end cut away to provide an upward facing connector mounting area, and the other end cut away to provide a downward facing connector mounting area. These mounting areas form a projection or shelf on which mating connectors 100 and 110 may be mounted.

Mating section 100 comprises a mating block 102 having tab seats or other mating features 104, and a signal connector 106. Mating section 110 comprises a mating block 112 having protruding tabs or other mating features 114 that match the mating features 104 of mating section 100. Mating section 110 further comprises a signal connector 116 that mates with the signal connector 106 of mating section 100, thereby providing interconnection of one or more signals running between joined transmitter or receiver segments 22 or 24.

Preferably, the mating features 102 and 112 of mating sections 100 and 110 are such that the two sections 100 and 110 will mate together in only one orientation relative to each other. That is, the two mating sections 100 and 110 have a defined mating orientation with respect to each other. Thus, mating sections 100 and 110 function similarly to the coupler assembly 52 and mating receptacle 70 of the connector 40, in that they allow keyed interconnection transmitter segments 22 with other transmitter segments 22, and receiver segments 24 with other receiver segments 24. However, as will be explained in more detail, the connection formed between segments 22 or 24 using mating sections 100 and 110 can provide for articulation or rotation between joined segments.

Preferably, the mating section 110 is mounted to a transmitter segment 22 in a first orientation. For example, the mating features (e.g., tabs) 114 in FIG. 8B are positioned away from the end of the segment 22. For receiver use, the mounting orientation of mating section 110 is reversed as compared to the transmitter mounting orientation of sections 110. Thus, FIG. 9B depicts the tabs 114 positioned towards the end of the segment 24.

In complementary fashion, FIG. 8A depicts the mating section 100 mounted to the transmitter segment 22 in an orientation that matches its mating features (e.g., tab seats) 104 to the mating features of transmitter-oriented mating sections 110. FIG. 9A depicts the mating section 100 in a reverse orientation, such that it will receive only receiver-oriented mating sections 110. That is, for transmitter-oriented mating sections 110 and 100, the defined mating orientation of sections 110 and 100 is achieved only when mating two transmitter segments 22. Likewise, the defined mating orientation of receiver-oriented sections 100 and 110 is achieved only when mating two receiver segments 24.

Preferably, the mating sections 110 are fixedly mounted, while the mating sections 100 are rotatably mounted. This arrangement allows a first segment 22 or 24 to be rotatably connected with a second segment 22 or 24. Rotation allows adjustment of the included angle between joined segments. However, the rotation of a mating section 100 should be constrained to plus or minus 90 degrees to prevent it from rotating around and inadvertently assuming the reverse orientation. That is, a mating section 100 should be constrained from rotating so far that it would allow mating with both first and second orientations of mating section 110.

This restriction of rotation angle may be achieved in a number of ways. For example, the mating section 100 may have a protruding pin on its underside that rides in a groove or slot formed in the segment 22 or 24 on which it is mounted (not shown). The groove or slot may be formed such that its limits correspond to the desired angular limits of rotation, thus preventing the mating section 100 from being over-rotated.

In some embodiments, the use of an additional bracket (not illustrated) may be used to fix or maintain the angle between joined segments 22 or joined segments 24. That is, two segments 22 or 24 joined via mating sections 100 and 110 are adjusted to the desired inter-segment angle and then fixed at that angle via a rigid bracket that preferably attaches to the segment housings of the joined segments. The previously incorporated related applications provide exemplary details for rotatably joined light curtain segments.

The above discussion and accompanying illustrations depict exemplary embodiments of the present invention. However, the present invention is subject to much variation. For example, the keying features used to differentiate between receiver and transmitter segment types may adopt a variety of shapes or forms and still provide for the reverse orientation keying of the present invention. Thus, it should be understood that all such variations fall within the scope and spirit of the present invention. Indeed, the present invention is not limited by the foregoing disclosure rather it is limited only by the following claims and the reasonable equivalents thereof.

What is claimed is:

1. A light curtain system that includes transmitter-keyed and receiver-keyed mating connectors to prevent interconnection between transmitter type segments and receiver type segments, the system comprising:
   a first transmitter segment that includes a first transmitter-keyed mating connector at a segment end, and a second transmitter segment to be interconnected with the first transmitter segment that includes a second transmitter-keyed mating connector at a segment end; and
   a first receiver segment that includes a first receiver-keyed mating connector at a segment end, and a second receiver segment to be interconnected with the first receiver segment that includes a second receiver-keyed mating connector at a segment end;
   said transmitter-keyed mating connectors having a different connector keying configuration than said receiver-keyed mating connectors to prevent interconnection of a transmitter segment with a receiver segment.

2. The system of claim 1, wherein, for transmitter type and receiver type segments, the first mating connector comprises a mating coupler that includes one or more protruding tabs occupying first tab positions for transmitter-keyed mating and occupying second tab positions for receiver-keyed mating, and wherein, the second mating connector comprises a mating receptacle that includes one or more tab seats corresponding to the first and second tab positions, and wherein the tab seats corresponding to the second tab positions are blacked for transmitter-keyed mating and the tab seats corresponding to the first tab positions are blacked for receiver-keyed mating.

3. The system of claim 2, wherein the first and second tab seats define keying holes, and further comprising one or more keying pins that may be selectively placed within the keying holes to block either the first or second tab seats.

4. The system of claim 2, wherein the mating coupler includes an integral coupler extension, such that a transmitter type light curtain segment is manufactured with its coupler extension having the one or more protruding tabs in the first tab positions and a receiver type light curtain segment is manufactured with its coupler extension having the one or more protruding tabs in the second tab positions.

5. The system of claim 1, further comprising a third transmitter segment interconnected with the second transmitter segment, such that the first, second and third transmitter segments comprise three series-connected transmitter segments, and a third receiver segment interconnected with the second receiver segment, such that the first, second and third receiver segments comprise three series-connected receiver segments;
   wherein a first end of the second transmitter segment includes the second mating connector to interconnect with the first mating connector of the first transmitter segment, and a second end of the second transmitter segment includes another first mating connector to interconnect with another second mating connector included at a segment end of the third transmitter segment; and
   wherein a first end of the second receiver segment includes the second mating connector to interconnect with the first mating connector of the first receiver segment, and a second end of the second receiver segment includes another first mating connector to interconnect with another second mating connector included at a segment end of the third receiver segment.

6. The system of claim 1 wherein the first mating connectors each comprise a first mating block that is mounted in reverse orientation between transmitter and receiver type light curtain segments.

7. The system of claim 6 wherein the second mating connectors each comprise a second mating block operative to mate with the first mating block, and wherein the second mating block is mounted in reverse orientation between transmitter and receiver type light curtain segments to match the reverse mounting of the first mating blocks.

8. The system of claim 7 wherein each of the first and second mating blocks further comprise first and second signal connectors, respectively, such that mating the first and second mating blocks interconnects the first and second signal connectors.

9. The system of claim 1 wherein at least one of the first and second mating connectors are rotatably mounted to respective light curtain segments, thereby allowing rotation between light curtain segments joined by respective ones of the first and second mating connectors.

10. The system of claim 2 wherein the mating coupler comprises a reversible coupler that includes a two-piece assembly, the two-piece assembly comprising a mounting plate and a tabbed plate reversibly filled thereon.

11. The system of claim 2 wherein the mating coupler comprises a coupler assembly that includes a first signal connector, and wherein the mating receptacle comprises matching second and third signal connectors positioned such that the first signal connector mates with the second signal connector when the mating coupler of a first light curtain segment is interconnected with the mating receptacle of a second light curtain segment from one side of the second light curtain segment, and mates with the third signal connector when the mating coupler is interconnected with the mating receptacle from the opposite side of the second light curtain segment.

12. The system of claim 11 wherein the second and third signal connectors are pinned in mirrored reverse relative to each other, such that a first signal line of the first light curtain segment connects with a corresponding first signal line of the second light curtain segment independent of whether the first light curtain segment mounts from the one side or the opposite side of the second light curtain segment.

13. A light curtain connector system for coupling together light curtain segments, said system comprising:

a first mating connector positioned at an end of a firs light curtain segment;

a second mating connector positioned at an end of a second light curtain segment to be interconnected with the first light curtain segment by mating the first and second mating connectors;

said first mating connector configured to have a first mating orientation if the first light curtain segment is a transmitter type light curtain, and configured to have a second mating orientation if the first light curtain segment is a receiver type light curtain segment; and said second mating connector configured to have a first mating orientation that complements the first mating orientation of the first mating connector if the second light curtain segment is a transmitter type light curtain segment, and configured to have a second mating orientation that complements the second mating orientation of the first mating connector if the second light curtain segment is a receiver type light curtain segment; and wherein the first mating connector mates with the second mating connector if the two mating connectors are configure with complementary mating orientations to thereby prevent the interconnection of transmitter type light curtain segments with receiver type light curtain segments.

14. The system of claim 13 wherein the first mating connector comprises a coupler assembly having at least one protruding tab that occupies a first tab position in the first mating orientation and occupies a second tab position in the second mating orientation.

15. The system of claim 14 wherein the second mating connector comprises a mating receptacle having first and second tab seats operative to receive the at least one protruding tab of the coupler assembly in the first and second tab positions, respectively; and wherein blocked said second tab seats defines the first mating orientation of the mating receptacle, and blocked said first tab seats defines the second mating orientation of the mating receptacle.

16. The system of claim 15 wherein the first and second tab seats define keying holes, and wherein the mating receptacle further comprises one or more removable keying elements to selectively block either the first or second tab seats.

17. The system of claim 16 wherein the keying holes defined in the first and second tab seats each comprise a threaded hole, and further wherein the one or more keying elements comprise threaded keying pins that may be removably threaded into said threaded holes.

18. The system of claim 15 wherein the coupler assembly further comprises a coupler plate adapted to seat within the mating receptacle, the coupler plate defining one or more mounting holes so that the coupler assembly may be fastened to the mating receptacle.

19. The system of claim 15 wherein the coupler assembly comprises a coupler plate defining a connector opening with a first signal connector positioned therein, and wherein the mating receptacle further comprises a mounting face defining a connector opening with a second signal connector positioned therein, the first and second signal connectors coupling one or more signals between joined light curtain segments when the coupler assembly is mated with the mating receptacle.

20. The system of claim 15 wherein the coupler assembly comprises a reversible coupler plate, and wherein the coupler plate defines the at least one protruding tab, such that reversing the coupler plate changes the at least one protruding tab from the first tab position to the second tab position.

21. A method for interconnecting transmitter type light segments only with other transmitter type light segments and receiver type light segments only with other receiver type light segments in multi-segment light curtain assemblies using the same type of connector for both transmitter and receiver type light segments, the method comprising:

configuring a first light curtain segment to have one of a first or second mating connector at one segment end for interconnection with a second light curtain segment having the opposite one of the first or second mating connectors at one segment end;

configuring the first and second mating connectors as transmitter-keyed mating connectors if the first and second light curtain segments are transmitter type light curtain segments; and configuring the first and second mating connectors as receiver-keyed mating connectors if the first and second light curtain segments are receiver type light curtain segments;

wherein a transmitter-keyed mating connector will not mate with a receiver-keyed mating connector to thereby prevent interconnection of transmitter type light curtain segments with receiver type curtain segments.

22. The method of claim 21 wherein configuring the first and second mating connectors as transmitter-keyed mating connectors comprises configuring the first and second mating connectors to have a first interconnection orientation, and configuring the first and second mating connectors as receiver-keyed mating connectors comprises configuring the first and second mating connectors to have a second, reversed interconnection orientation.

23. The method of claim 21 wherein the first mating connector comprises a mating coupler having one or more mating features occupying first mating positions when keyed for transmitter use and occupying second mating positions when keyed for receiver use, and wherein the second mating connector comprises a mating receptacle having first receiving features corresponding to the first mating positions of the mating features of the mating coupler, and second receiving features corresponding to the second mating positions of the one or more mating features of the mating coupler, the method further comprising:

blocking the second receiving features of the mating receptacle to key the mating receptacle for transmitter use; and blocking the first receiving features of the mating receptacle to key the mating receptacle for receiver use.

24. The method of claim 23 wherein the first and second receiving features each comprise one or more receiving cavities, and wherein blocking either the first or second mating features comprises obstructing the one or more receiving cavities of either the first or second mating features.

25. The method of claim 24 wherein each receiving cavity defines a hole, and wherein obstructing the one or more receiving cavities of either the first or second receiving features comprises installing a pin into the holes defined by the one or more receiving cavities associated with either the first or second receiving features.

26. The method of claim 21 wherein the first and second mating connectors further comprise first and second signal connectors, respectively, the method further comprising interconnecting one or more signals between joined light segments via the first and second signal connectors.

27. The method of claim 21 wherein the first and second mating connectors comprise first and second mating blocks having a defined mating orientation with respect to each other, the method further comprising mounting first and second mating blocks to transmitter type light segments in first connector mating orientations, and to receiver type light segments in second connector mating orientations that are a mirror reverse of the first connector mating orientations.

* * * * *